United States Patent [19]
Kitamoto et al.

[11] Patent Number: 4,520,069
[45] Date of Patent: May 28, 1985

[54] MAGNETIC RECORDING MEDIUM

[75] Inventors: Tatsuji Kitamoto; Goro Akashi, both of Odawara, Japan

[73] Assignee: Fuji Photo Film Co., Ltd., Minami-ashigara, Japan

[21] Appl. No.: 375,691

[22] Filed: May 6, 1982

[30] Foreign Application Priority Data

May 7, 1981 [JP] Japan ................................. 56-67639

[51] Int. Cl.$^3$ ............................ G11B 5/70; B32B 5/30
[52] U.S. Cl. .................... 428/328; 252/62.54; 360/134; 360/135; 360/136; 427/128; 427/131; 427/132; 428/329; 428/336; 428/694; 428/900
[58] Field of Search ....................... 427/131, 132, 128; 428/692, 693, 694, 336, 328, 329; 360/134; 252/62.54

[56] References Cited

U.S. PATENT DOCUMENTS

| | | | |
|---|---|---|---|
| 3,052,567 | 9/1962 | Gabor | 428/335 |
| 3,185,775 | 5/1965 | Camras | 360/134 |
| 4,265,931 | 5/1981 | Tamai | 427/131 |

*Primary Examiner*—Ellis P. Robinson
*Attorney, Agent, or Firm*—Armstrong, Nikaido, Marmelstein & Kubovik

[57]   ABSTRACT

In a magnetic recording medium comprising a non-magnetic support and a magnetic recording layer coated thereon in which ferromagnetic particles are dispersed in a non-magnetic binder, an improvement consists in that the ferromagnetic particles have a mean particle length of at most 0.3 microns with a length to width ratio of more than 1 but at most 3 and optionally are subjected to an orientation treatment in a magnetic field in the vertical direction to the recording surface.

7 Claims, No Drawings

MAGNETIC RECORDING MEDIUM

BACKGROUND OF THE INVENTION

1. Field of the Invention

This invention relates to a magnetic recording medium and more particularly, it is concerned with an improved magnetic recording medium having an S/N ratio increased in high density recording.

2. Description of the Prior Art

Up to the present time, various trials have been made to increase the recording density of a magnetic tape (relative speed of tape and head/maximum frequency of recording signal) from the requirements as to the high fidelity in audio cassettes and the low speed in small-sized video tape recorders. In these trials, for example, it is proposed to increase the coercive force of a magnetic layer, to increase simultaneously the residual magnetization and coercive force as in metallic cassettes or to arrange a magnetic layer with a high coercive force as an upper layer to increase the output at a high recording density with preventing the output at a low recording density from lowering.

Lately the thought of vertical magnetization recording has been introduced to use effectively the residual magnetization component in the vertical direction to the surface of a magnetic recording medium. It is said that according to this vertical magnetization recording, the recording density as defined above becomes high, the output decrease due to self-demagnetization (decrease of the residual magnetization by a self-demagnetization field acting in a direction to negative the self-magnetization between N and S poles formed by the self residual magnetization, which is increased with the decrease of the distance between the N and S poles) is not so large if the recording wavelength is smaller than the thickness of a magnetic layer, and the high density recording is effective with a recording wavelength of 1-2 microns or less. As a medium for the vertical magnetization recording, there have been used at present materials capable of being readily magnetized in the vertical direction, such as sputtered film of Co—Cr alloy.

In magnetic recording media with magnetic layers of coating type, utilization of a slant or vertical magnetization component, not in parallel with the magnetic surface, has been proposed as described in, for example, U.S. Pat. Nos. 3,185,775 and 3,052,567 and Japanese Patent Publication No. 15203/1974. However, these methods have the drawbacks that the noise level is still high and the output is low.

SUMMARY OF THE INVENTION

It is an object of the present invention to provide a magnetic recording medium whereby the above described drawbacks of the prior art can be overcome.

It is another object of the present invention to provide a magnetic recording medium having a high S/N ratio in a high recording density.

It is a further object of the present invention to provide a magnetic recording medium exhibiting a high output in a short recording wavelength range.

These objects can be attained by a magnetic recording medium comprising a non-magnetic support and a magnetic recording layer coated thereon in which ferromagnetic particles are dispersed in a non-magnetic binder, characterized in that the ferromagnetic particles have a mean particle length of 0.3 micron or less with a length to width ratio of more than 1 but at most 3, and by a magnetic recording medium comprising a non-magnetic support and a magnetic recording layer coated thereon in which ferromagnetic particles are dispersed in a non-magnetic binder, characterized in that the ferromagnetic particles have a mean particle length of 0.3 micron or less with a length to width ratio of more than 1 but at most 3 and are subjected to an orientation treatment in the vertical direction to a recording surface.

DETAILED DESCRIPTION OF THE INVENTION

The present invention aims at solving the drawbacks of the prior art by using ferromagnetic particles in an oval form with a length of 0.30 micron or less with a length to width ratio of more than 1 but at most 3 instead of ordinary acicular particles having a long diameter of 0.4 to 2 microns or 0.3 to 1 micron with a length to width ratio of 5 to 20 used in the prior art. That is to say, by shortening the length of particle, the noise level by the discontinuity of magnetization due to the size of particle is lowered and by decreasing the length to width ratio, the orientation tendency of particles lying in a surface, e.g. orientation in a surface due to thickness decrease of a coating in the thickness direction during coating and drying or orientation in the flowing and spreading direction due to flowing during coating can be suppressed. If necessary, the residual magnetization vertical to a surface is enlarged by giving positively a tendency capable of being readily oriented vertically to the surface.

Accordingly, in a magnetic recording medium comprising a non-magnetic support and a magnetic recording layer coated thereon in which ferromagnetic particles are dispersed in a non-magnetic binder, the features of the present invention consist in (1) that the ferromagnetic particles have a mean particle length of at most 0.3 micron with a length to width ratio of more than 1 but at most 3, and (2) that the ferromagnetic particles have a mean particle length of at most 0.3 micron with a length to width ratio of more than 1 but at most 3 and are subjected to an orientation treatment in the vertical direction to the recording surface.

As the ferromagnetic particles, there are used ferromagnetic fine powders of $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, Berthollide compounds of $\gamma\text{-Fe}_2\text{O}_3$ and $\text{Fe}_3\text{O}_4$ ($\text{FeO}_x$: $1.33 < x < 1.50$), Co-doped Berthollide compounds of $\gamma\text{-Fe}_2\text{O}_3$ and $\text{Fe}_3\text{O}_4$ ($\text{FeO}_x$: $1.33 < x < 1.50$), $\text{CrO}_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni—Co alloys.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propinate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 11069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymer and diisocyanate prepolymers, mixtures of polyesterpolyols and polyisocyanates, ure-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, U.S. Pat. Nos. 3,144,353, 3,320,090, 3,437,510, 3,597,273, 3,781,210 and 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, muristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide, corundum, diamond, synthetic diamond, garnet, emery (main component: corundum and magnetite) and the like. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese Patent Application No. 26749/1973, U.S. Pat. Nos. 3,007,807, 3,041,196, 3,293,066, 3,630,910 and 3,687,725, British Pat. No. 1,145,349, West German Pat. Nos. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications)", Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc. Such a non-magnetic support can have a thickness of about 3 to 100 microns, preferably 5 to 50 microns in the form of a film or sheet.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku (Coating Engineering)", page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; etc.

The thickness of the magnetic layer is preferably determined so that the thickness be approximately a recording wavelength and the self-demagnetization be prevented when there is a residual magnetization in the vertical direction and it is generally 0.1 to 10 microns, preferably 0.2 to 5 microns.

When such a magnetic layer is coated, there are two cases where magnetization in the vertical direction of magnetic particles filled at random without magnetic orientation is used and where the magnetic susceptibility in the vertical direction is raised by effecting positively a magnetic orientation treatment in the vertical direction to a web surface. As is evident from Examples, the use of the magnetic particles according to the present invention results in increase of the residual magnetic susceptibility in the vertical magnetization direction more than the case of using the ordinary acicular particles in any case, but of course, the case of effecting the orientation in the vertical direction is more excellent.

In the present invention, the magnetic orientation treatment of ferromagnetic particles in the vertical direction to a recording surface is effectively carried out in a DC magnetic field by a permanent magnet, electromagnet or solenoid optionally with superposing an AC magnetic field or with using jointly ultrasonic wave.

The thus obtained magnetic recording medium can exhibit a high output and a low noise within a range of short wavelength such as 1 micron, thus giving an excellent S/N ratio, as described in Examples.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples.

EXAMPLE 1

$\gamma$-Fe$_2$O$_3$ fine powders with a particle size of 0.5$\mu$, 0.3$\mu$, 0.25$\mu$, 0.2$\mu$ and 0.1$\mu$ and with a length to width ratio of 1.5, 2, 3, 5 and 10 were prepared. For controlling the particle size and shape of the $\gamma$-Fe$_2$O$_3$ fine powder, the crystallizing conditions of $\alpha$-FeOOH as a starting material were varied, for example, according to Japanese Patent Publication No. 21163/1961 and Japanese Patent Application (OPI) No. 80999/1975. In addition, $\gamma$-Fe$_2$O$_3$ fine cubic powder with a length of 0.2$\mu$ and a length to width ratio of 1 was prepared. The above described ferromagnetic powders had a coercive force of 280 to 330 Oe.

Using the above described $\gamma$-Fe$_2$O$_3$ fine powders, coating liquids were prepared according to the following recipe:

|  | parts by weight |
| --- | --- |
| $\gamma$-Fe$_2$O$_3$ Fine Powder | 100 |
| Vinyl Chloride-Vinyl Acetate Copolymer | 27 |
| Acrylic Resin | 7 |
| Carbon Black | 8 |
| Silicone Oil | 1 |
| Amyl Stearate | 0.2 |
| Methyl Ethyl Ketone | 180 |

These compositions were ball milled and well dispersed, coated onto a polyester base with a thickness of 22μ to give a coating of 0.5μ on dry base, and passed through magnetic poles forming a magnetic field of 800 G in the vertical direction, where it was substantially dried by hot air.

The thus resulting samples were then subjected to a calendering treatment to smoothen the surface and to measurement of the squareness ratio in the vertical direction to the surface by means of a Vibrating Sample Magnetometer (made by Toei Kogyo Co.), thus obtaining results as shown in Table 1:

TABLE 1

| Long Diameter (μ) | Length/Width Ratio | | | | |
|---|---|---|---|---|---|
| | 10 | 5 | 3 | 2 | 1.5 |
| 0.5 | 0.33 | — | — | 0.35 | — |
| 0.3 | 0.33 | 0.35 | 0.38 | 0.38 | 0.38 |
| 0.25 | — | — | — | 0.38 | 0.38 |
| 0.2 | — | — | 0.39 | 0.39 | 0.39 |
| 0.1 | 0.35 | 0.37 | 0.39 | 0.39 | 0.39 |

As is evident from Table 1, the squareness ratio after the orientation is more excellent in the range of the present invention, in which the acicular ratio ranges from 1.5 to 3.

As to the above described samples and a comparative sample of type No. 1 prepared by coating γ-Fe₂O₃ powder with a particle length of 0.5μ and with a length/width ratio of 12 to give a thickness of 5μ on dry base and subjecting to an orientation treatment in the longitudinal direction of the surface in a magnetic field formed in the web direction by a solenoid and to a calendering treatment, each of these samples was slit in a width of ½" and subjected to measurement of the magnetic properties to obtain results shown in Table 2.

In the short wavelength recording, the output and noise level at a recording wavelength of 1μ were measured by a VTR of helical type. Comparison with the comparative example type No. 1 was carried out concerning the ratio of the output when a sine wave signal of 3 MHz was recorded and then reproduced by using a ferrite head with a head gap of 0.2μ as a head in a short wavelength range and a head and tape relative speed of 2.9 m/sec to the noise level at a point of 2 MHz apart by 1 MHz from the reproduction output.

TABLE 2

| Long Diameter (μ) | | Length/Width Ratio | | | | | |
|---|---|---|---|---|---|---|---|
| | | 10 | 5 | 3 | 2 | 1.5 | 12* |
| 0.5 | A | +0.5 | — | — | 0 | — | 0 |
| | B | 0 | — | — | +0.5 | — | 0 |
| 0.3 | A | 0 | 0 | — | +1.5 | +1.5 | |
| | B | +0.5 | +0.5 | — | +1 | +2 | |
| 0.25 | A | — | — | — | +4 | +4 | |
| | B | — | — | — | +3 | +4 | |
| 0.2 | A | — | — | +4 | +6 | +6 | |
| | B | — | — | +4 | +6 | +7 | |
| 0.1 | A | +2 | +3 | +4 | +6 | +6 | |
| | B | +1 | +2 | +4 | +6 | +7 | |

Note:
*Comparative Sample Type No. 1
A: Short wavelength output (dB) at a recording wavelength of 1μ
B: In A, ratio of output to noise at a point apart by 1 MHz (A and B have the same meanings in the following tables)

As is evident from Table 2, the output is increased within a range of a long diameter of at most 0.25μ and a length/width ratio of more than 1 and at most 3 in a short wavelength range similarly to the results of squareness ratio of Table 1 and the noise is lowered with the decrease of the particle size and with the decrease of the length/width ratio. Thus, it is clear that better results are obtained as to S/N ratio within a range of a long diameter of at most 0.30μ and a length/width ratio of more than 1 and at most 3.

EXAMPLE 2

The γ-Fe₂O₃ powder used in Example 1 was reduced at 330° C. in H₂ stream to obtain metallic iron having a similar shape to γ-Fe₂O₃, a length shrunk by about 20% and a coercive force of 900 to 1050 Oe. Comparison tests were carried out by keeping the other conditions similar to Example 1 and using a metallic iron powder having a long diameter of 0.4μ and a length/width ratio of 12 as a comparative sample of type No. 2, thus obtaining results as shown in Tables 3 and 4 corresponding to Tables 1 and 2. In these results, there are similar tendencies to Example 1.

TABLE 3

| Long Diameter (μ) | Length/Width Ratio | | | | |
|---|---|---|---|---|---|
| | 10 | 5 | 3 | 2 | 1.5 |
| 0.4 | 0.32 | — | — | 0.35 | — |
| 0.25 | 0.33 | 0.35 | 0.37 | 0.37 | 0.37 |
| 0.2 | — | — | — | 0.37 | 0.37 |
| 0.15 | — | — | 0.38 | 0.38 | 0.39 |
| 0.08 | 0.34 | 0.35 | 0.37 | 0.39 | 0.38 |

TABLE 4

| Long Diameter (μ) | | Length/Width Ratio | | | | |
|---|---|---|---|---|---|---|
| | | 10 | 5 | 3 | 2 | 12 |
| 0.4 | A | 0 | — | — | +0.5 | 0 |
| | B | 0 | — | — | +1 | 0 |
| 0.25 | A | 0 | +0.5 | +3 | +1.5 | |
| | B | +1 | +1.5 | +3 | +2 | |
| 0.2 | A | — | — | — | +4 | |
| | B | — | — | — | +5 | |

Note:
*Comparative Sample of Type No. 2

EXAMPLE 3

In an analogous manner to Example 1, γ-Fe₂O₃ fine powders were prepared but coprecipitating Co ion at the end of the growth reaction of goethite. By varying the amount of Co, the coercive force was adjusted to within a range of 650 to 600 Oe. In an analogous manner to Example 1, tapes were made and subjected to measurement of the output and C/N ratio in a short wavelength range to obtain results shown in Table 5. For comparison, γ-Fe₂O₃-Co powder with a particle length of 0.5μ and a length/width ratio of 12 was used as a comparative sample of type No. 3. It will be apparent from these results that samples using the particles of the present invention are more excellent in output and noise level.

TABLE 5

| Long Diameter (μ) | | Length/Width Ratio | | | | |
|---|---|---|---|---|---|---|
| | | 10 | 5 | 3 | 2 | 12 |
| 0.5 | A | 0 | — | — | +0.5 | 0 |
| | B | 0 | — | — | +0.5 | 0 |
| 0.3 | A | 0 | 0 | +2 | +3 | |
| | B | +0.5 | +1 | +3 | +3 | |
| 0.2 | A | — | — | — | +5 | |
| | B | — | — | — | +4.5 | |

Note:
*Comparative Sample of Type No. 3

In addition, the similar effects or advantages were found as to $CrO_2$ and Co-dopes iron oxides prepared by other methods than that of Example 3.

The foregoing Examples are limited to the case of orientation in vertical direction, but even if the orientation in vertical direction is insufficient, the use of fine particles having a small length/width ratio within the specified range of the present invention results in a relatively large squareness ratio in vertical direction.

What is claimed is:

1. A magnetic recording medium having a high signal-to-noise ratio in high density recording and a high output in short wavelength recording and comprising a non-magnetic support and a magnetic recording layer coated thereon in which ferromagnetic particles having an oval form are dispersed in a non-magnetic binder, characterized in that the ferromagnetic particles have a mean particle length of at most 0.3 micron with a length to width ratio of more than 1 but at most 3, and are subjected to an orientation treatment in the vertical direction to the recording surface.

2. The magnetic recording medium of claim 1, wherein the ferromagnetic particles are selected from the group consisting of particles of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni—Co alloys.

3. The magnetic recording medium of claim 1, wherein the mixing ratio by weight of the ferromagnetic particles and binder is 100 to 200 parts of the binder to 100 parts of the ferromagnetic particles.

4. The magnetic recording medium of claim 1, wherein the magnetic recording layer has a thickness of 0.1 to 10 microns.

5. The magnetic recording medium of claim 1, wherein the orientation treatment is carried out in a magnetic field in the vertical direction to the recording surface.

6. The magnetic recording medium of claim 5, wherein the magnetic field is a DC field or AC field.

7. The magnetic recording medium of claim 6, wherein the magnetic field has a field strength of 500 to 5000 gauss.

* * * * *